Patented Dec. 28, 1943

2,337,597

UNITED STATES PATENT OFFICE 2,337,597

DEFLOCCULENT FOR CLAYS

Flemmon P. Hall, Syracuse, N. Y., assignor to Onondaga Pottery Company, Syracuse, N. Y., a corporation of New York No Drawing. Application October 29, 1941, Serial No. 417,009

10 Claims. (Cl. 106—72)

My present invention relates to a novel method of deflocculating clays and a novel deflocculant for use particularly in the manufacture of ceramic articles by casting ceramic body slip in plaster of Paris moulds. As is well known to those skilled in the art, certain clays, particularly those of the type known as hard Georgia clays have high gel forming properties which have prevented them from being used to a considerable extent in clay slips for use in casting ceramic articles such as table ware and sanitary porcelain, since it has not been possible to deflocculate such clays successfully by means of the ordinary alkaline deflocculants such as sodium carbonate, sodium silicate, sodium tannate, etc. Therefore, imported clays and particularly English clays have been used although the hard Georgia clays have qualities which make them highly desirable.

I believe that the presence of unattached ions such as calcium ions, magnesium ions, and sulphate ions in clays of the type of the hard Georgia clays which are not satisfactory for use in the casting process is in part, if not chiefly or entirely, responsible for the resistance of these clays to the action of the common deflocculants. This has been proved by washing repeatedly with distilled water such clay as marketed to remove any unattached ions, after which treatment these clays respond satisfactorily to the action of deflocculants, but when ions (calcium, magnesium or sulphate) are again added the response to the deflocculants diminishes. However, purification of such clays by washing with distilled water is not commercially possible because of the cost of the large quantities of distilled water required and the long time required for settling. I have also attempted to render clays suitable for casting by converting the interfering ions into insoluble salts by adding barium carbonate to the casting slip. In this case the barium converts the sulphate ions into insoluble barium sulphate while the carbonate takes care of the calcium and magnesium ions. Attempts to produce the same effect by the use of sodium, potassium or ammonium carbonate or mixtures of them have not proved successful. But while the treatment with barium carbonate described makes it possible to deflocculate the casting clays having high gel forming properties such as the hard Georgia clays with the common deflocculants, I find that the specific gravity of the slip is so low that the cast sticks to the mould and cracks on drying.

My present invention, therefore, is based on the discovery that if the hard Georgia clays and like clays having high gel forming properties are treated with suitable amounts of common deflocculants such as sodium silicate, or sodium tannate in the presence of barium carbonate and sodium-hexa-metaphosphate $(NaPO_3)_6$, a casting slip can be produced with a specific gravity as high as 1.86 and a viscosity as low as 200 seconds. (In speaking of viscosity I refer to the time of flow of 250 c. c. through a standard efflux viscosimeter.) I have successfully cast from such slips a large number of items both by the solid and the pour process.

My present invention makes it possible to use for certain purposes in ceramics, the hard Georgia clays and like kaolins which while having extremely valuable properties have not been thought to be usable for casting owing to the difficulty of deflocculating them and producing slips having the requisite specific gravity and viscosity. The invention makes these difficult casting clays available for purposes for which English and other imported clays have been used in the past.

I have found that satisfactory results cannot be obtained by the use of either barium carbonate or sodium metaphosphate without the other, because as pointed out above if too much barium carbonate is used the specific gravity is too low while if too much sodium metaphosphate is used the slip becomes stringy and sticks to the mould. To obtain the best results it seems to be desirable to use some of the common deflocculants in combination with no more than enough, barium carbonate to produce the specific gravity required and not enough sodium metaphosphate to render the slip stringy. Calcium, magnesium and sulphate ions appear to enhance the tendency to gel forming. Apparently, the barium carbonate replaces the gel-inducing soluble lime and magnesium with non-gel inducing barium compound, while the sodium metaphosphate acts as a buffer and prevents the complete elimination of gel formation, some gel formation being apparently necessary to provide for shrinkage which frees the cast from the mould and thus prevents sticking of the cast to the mould. The use of the barium carbonate takes care of the calcium, magnesium and sulphate ions so that it is possible to use very small amounts of sodium metaphosphate, large amounts of which cause stringiness.

The sodium hexametaphosphate employed has the formula $(NaPO_3)_6$ and is obtainable under the trade name "Calgon."

The sodium silicate N-brand referred to in the examples is a water glass having the composition $Na_2O$ 9.2, $SiO_3$ 29.3 and water 61.5.

My invention will be more fully understood from the following examples:

*Example I*

| | Per cent |
|---|---|
| Victoria ball clay | 15 |
| Hard Georgia kaolin | 15 |
| North Carolina clay | 11 |
| Tennessee ball clay | 9 |
| Potter's flint | 35 |
| Oxford feldspar | 14 |

To a mixture of 15,000 grams of the above and 4,900 grams of tap water there was added

| | Per cent |
|---|---|
| Sodium silicate ("N." brand) | 0.1 |
| Sodium tannate (mixture of 50% tannic acid and 50% sodium carbonate) | 0.02 |
| Barium carbonate | 0.4 |
| Sodium-metaphosphate—"Calgon" | 0.04 |

The percentages of the deflocculants added, i. e., sodium silicate, sodium tannate, barium carbonate and "Calgon," were calculated on the solid content of the body which in the above example was 15,000 grams.

The above mixture produced a slip having a specific gravity of 1.86 and a viscosity of 200 seconds at 81° F. This slip was used successfully to cast a number of large pieces, some of which were cast solid and some by the pour process.

*Example II*

| | Per cent |
|---|---|
| Hard Georgia kaolin | 15 |
| Florida kaolin | 6 |
| Kentucky ball clay, Old Mine #4 | 6 |
| North Carolina china clay | 17 |
| Oxford feldspar | 19 |
| Potter's flint | 35 |
| Whiting | 2 |

To a mixture of 15,000 grams of the above and 4,900 grams of tap water there was added

| | Per cent |
|---|---|
| Sodium silicate ("N." brand) | 0.1 |
| Sodium tannate | 0.04 |
| Barium carbonate | 0.4 |
| Sodium-metaphosphate—"Calgon" | 0.035 |

The above mixture produced a slip having specific gravity which was varied as follows by additions of water:

| | |
|---|---|
| 1.860 | 230 second flow at 79° F. |
| 1.850 | 190 second flow at 79° F. |
| 1.840 | 160 second flow at 79° F. |

This slip was used successfully for casting large pieces.

It will thus be seen that the combination of barium carbonate and sodium-metaphosphate when used with ordinary deflocculants produced slips from difficult casting clays which had high specific gravity and low viscosity.

I find that the proportion of barium carbonate should be between 0.1% and 0.6% and that 0.4% is the preferred amount, the percentage being based on the total solid content of the slip. For the sodium-metaphosphate the range appears to be from 0.01% to 0.1% and the preferred amount about 0.04%. Too large a proportion of barium carbonate produces slips having too low specific gravity and hence casts which tend to stick to the mould and crack on drying; while too large proportions of sodium-metaphosphate have the effect of producing over-deflocculation or "stringy" slips which stick to moulds and do not release in reasonable time. It is, therefore, better to use the common deflocculants as far as possible, and use only enough sodium metaphosphate to complete the deflocculation. Only when both the ingredients are used together in about the proportions specified are thoroughly satisfactory results obtained. It will also be understood that the proportions must be varied somewhat according to the particular mixture of clay in the slip. The amount of barium carbonate is roughly ten times the amount of the sodium-metaphosphate used.

While I have described herein the use of barium carbonate in combination with sodium-metaphosphate, it is possible that comparable results may be obtained with the use of equivalent substances which respectively dispose of the interfering ions and prevent complete elimination of gel formation. Strontium carbonate may possibly be the equivalent of barium carbonate but, so far I have been unable to discover any substance which will take the place of sodium-metaphosphate.

I claim:

1. The method of deflocculating clay slips which includes adding barium carbonate and sodium metaphosphate, the two together not being in excess of 0.5% of the solids in the slip.

2. The method of deflocculating clay slips which includes adding barium carbonate and sodium metaphosphate in the proportion of from 0.1% to 0.6% of the carbonate and from 0.01% to 0.10% of the metaphosphate.

3. The method of deflocculating clay slips which includes adding barium carbonate and sodium metaphosphate, the amount of the carbonate being substantially ten times that of the metaphosphate, and the two together not being in excess of 0.5% of the solids in the slip.

4. The method of deflocculating clay slips which includes adding together with common deflocculants barium carbonate and sodium metaphosphate, the amount of the carbonate being substantially ten times that of the metaphosphate, and the two together not being in excess of 0.5% of the solids in the slip.

5. The deflocculant for clay slip including clays having high gel forming properties which comprises barium carbonate and sodium metaphosphate in the proportions of about ten parts of carbonate to one part of metaphosphate.

6. The deflocculant for clay slip including clays having high gel forming properties which comprises barium carbonate and sodium metaphosphate in the proportions of about ten parts of carbonate to one part of metaphosphate and the two together not in excess of 0.5% of the solids in the slip.

7. The method of deflocculating clay slips containing clays having high gel forming properties which consists in adding common deflocculants and in addition thereto barium carbonate and sodium metaphosphate the amount of the carbonate being substantially ten times that of the metaphosphate, and the two together not being in excess of 0.5% of the solids in the slip.

8. The improved casting slip including clays having high gel forming properties, together with barium carbonate and sodium metaphosphate, the two together not being in excess of 0.5% of the solids in the slip.

9. The improved casting slip made with clays having high gel forming properties and containing barium carbonate and sodium metaphosphate in addition to common deflocculants, the two together not being in excess of 0.5% of the solids in the slip.

10. The improved method of deflocculating clay slips containing clays having high gel forming properties due to the presence of calcium, magnesium or sulphate ions which includes disposing of the said ions by the addition of barium carbonate while preventing complete elimination of gel forming properties by the addition of sodium metaphosphate, the barium sulphate and the sodium metaphosphate together not being in excess of 0.5% of the solids in the slip.

FLEMMON P. HALL.